United States Patent [19]
Cherry et al.

[11] Patent Number: 6,040,765
[45] Date of Patent: Mar. 21, 2000

[54] OBSTACLE DETECTION SYSTEM BUILT-IN TEST METHOD AND APPARATUS

[75] Inventors: James R. Cherry, Windham, N.H.; Abel Raynus, Malden, Mass.

[73] Assignee: Armatron International, Inc., Melrose, Mass.

[21] Appl. No.: 09/012,785

[22] Filed: Jan. 23, 1998

[51] Int. Cl.⁷ .............................. B60Q 1/00; G01S 15/00
[52] U.S. Cl. .................... 340/436; 340/435; 340/514; 340/903; 367/93; 180/167
[58] Field of Search ................... 340/436, 435, 340/514, 903; 367/93, 94; 180/167, 169; 11/11

[56] References Cited

U.S. PATENT DOCUMENTS

| | | | |
|---|---|---|---|
| 3,754,222 | 8/1973 | Eisenberg | 367/93 |
| 4,326,273 | 4/1982 | Vancha | 367/112 |
| 4,500,977 | 2/1985 | Gelhard | 367/909 |
| 4,647,913 | 3/1987 | Pantus | 340/522 |
| 4,823,901 | 4/1989 | Harding | 180/167 |
| 4,967,860 | 11/1990 | Kremser | 180/169 |
| 5,160,927 | 11/1992 | Cherry et al. | 340/904 |
| 5,235,315 | 8/1993 | Cherry et al. | 340/435 |
| 5,432,516 | 7/1995 | Cherry et al. | 340/435 |
| 5,577,006 | 11/1996 | Kuc | 367/104 |

*Primary Examiner*—Donnie L. Crosland
*Attorney, Agent, or Firm*—Samuels, Gauthier & Stevens

[57] ABSTRACT

An obstacle detection system includes an acoustic piezoelectric transducer capable of radiating and receiving ultrasonic energy. During a BIT transmission period, a controller briefly enables a transmit circuit which provides an AC transmit signal that induces oscillatory motion in a piezoelectric element within the transducer. At the end of BIT transmission period the controller disables the transmit circuit and begins BIT receive period operation. Once the transmit circuit is disabled, the oscillatory motion of the piezoelectric element begins to dampen out causing the transducer to generate and provide a vibration generated signal which is input to a receive circuit which detects the presence of the vibration generated signal and provides received status signal indicative thereof. If the vibration generated signal is not present during this period, a system fault exists and the controller notifies the system user.

17 Claims, 4 Drawing Sheets

OBSTACLE DETECTION SYSTEM BUILT-IN TEST METHOD AND APPARATUS

TECHNICAL FIELD

This invention relates to an obstacle detection system, and in particular to built-in-test of the obstacle detection system.

BACKGROUND OF THE INVENTION

Various obstacle detection systems have been proposed to warn drivers of the presence of an object in the path of a moveable vehicle. Typically, such warning systems provide a suitable audio and/or visible signal when an object is detected in the path of the vehicle.

In consideration of the importance of the operability of such object detection systems, it is often desirable for such systems to include self testing capabilities. For example, U.S. Pat. No. 5,160,927, of common Assignee and incorporated herein by reference, describes an object detection system with a self test feature wherein object detection signals transmitted by the transmitter are received directly by the receiver for a self test check. Another object detection system with a self test feature is described in U.S. Pat. No. 4,910,512 in which signals provided by a transmitter are reflected by acoustic shunts or acoustic reflectors for reception by a receiver for self testing purposes. Furthermore, U.S. Pat. No. 4,561,064 to Brüggen et al. describes an object detection system with a self test feature in which a fixed reflector located on a vehicle reflects signals from the transmitter to the receiver to evaluate the system.

Another obstacle detection system which utilizes self testing features is described in U.S. Pat. No. 5,235,315, of common Assignee and incorporated herein by reference, in which a controller is provided for adjusting the gain and signal threshold of a receiver so that the receiver initially is able to detect reflections from irregularities in the ground surface. Once this receiver receives a transmitted signal reflected from the ground surface, an indication is provided that the system is in a ready or operable state.

U.S. Pat. No. 5,432,516, which is also assigned the Assignee of the present invention and hereby incorporated herein by reference, articulately discloses a radar obstacle detection system that includes a self-test to detect system failures. The system uses a dedicated auxiliary-antenna which radiates a delayed test signal to the main antenna of the system. The delayed test signal received by the main antenna is compared against an expected signal to detect operational faults in the system.

Although the foregoing systems perform various tests to confirm system integrity, there is a need for an obstacle detection system having a built-in-test which does not require additional reflecting elements and/or specific positioning of the transmitter and receiver in order to avoid interference caused by preexisting structures on the vehicle, or rely upon signals reflected from outside the systems such as a ground surface.

SUMMARY OF THE INVENTION

An object of the present invention is to provide an obstacle detection system built-in-test (BIT) which operates independent of the ground surface upon which the obstacle detection system operates.

Another object is to perform BIT on an obstacle detection system having a single acoustic transducer.

Briefly, according to the present invention, an obstacle detection system includes an acoustic piezoelectric transducer capable of radiating and receiving ultrasonic energy. During a BIT transmission period, a controller briefly enables a transmit circuit which provides an AC transmit signal that induces oscillatory motion in a piezoelectric element within the transducer. At the end of BIT transmission period the controller disables the transmit circuit and begins BIT receive period operation. Once the transmit circuit is disabled, the oscillatory motion of the piezoelectric element begins to dampen out causing the transducer to generate and provide a vibration generated signal which is input to a receive circuit that detects the presence of the vibration generated signal. If the vibration generated signal is not present during the BIT receive period, a system fault exists and the controller notifies the system user.

The system preferably employs a single transducer which is coupled to both the transmit circuit and the receive circuit via either a fixed coupling (e.g., a transformer), or via an electronic switching network.

During the BIT transmission period the transmit circuit excites the transducer for only a short duration (e.g., one millisecond). At the end of the BIT transmission period, the BIT receive period begins and the transducer will only generate the vibration generated signal if: (i) the transmission circuit properly excites the transducer, (ii) the piezoelectric element within the transducer is free to vibrate and generate the signal, and (iii) the receive circuit and controller are operating properly. The BIT transmission period is relatively short, and the BIT receive period begins immediately after the BIT transmission period to ensure that reflected ultrasonic energy is not returned to the transducer during the BIT receive period. This BIT can be performed during system initialization, and/or periodically during the operation of the obstacle detection system.

An advantage of the present invention is that the BIT can be performed independent of the surface upon which the vehicle associated with the obstacle detection system is operating.

Another advantage is that the operational integrity of the obstacle detection system can be quickly and easily verified.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
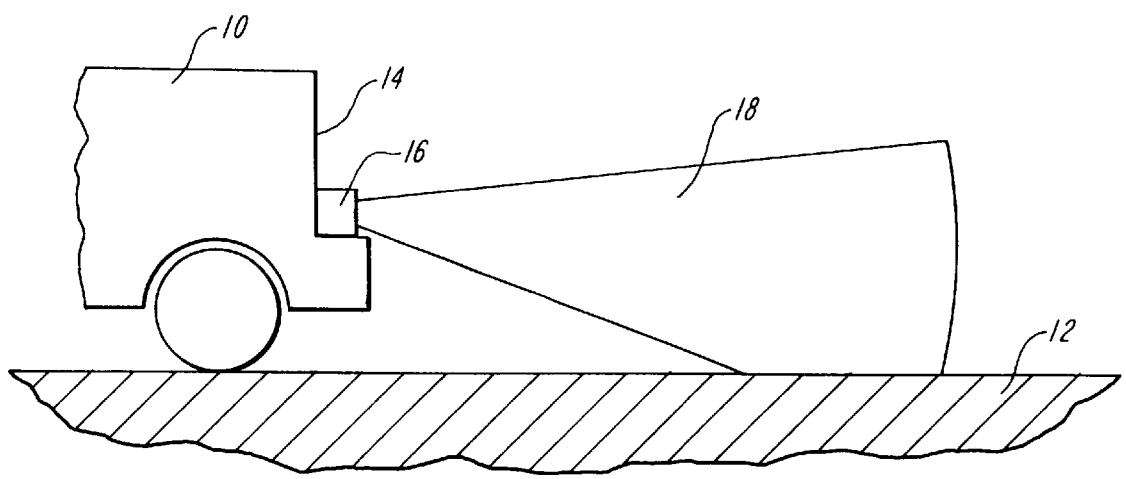
FIG. 1 illustrates a moveable vehicle having an acoustic obstacle detection system.

FIG. 1 illustrates a vehicle 10 which moves along a surface 12. The vehicle 10 includes an end portion 14 to which an acoustic obstacle detection system 16 is mounted. As known, the system 16 detects objects (not shown) within a field of view 18.

Figure 2:
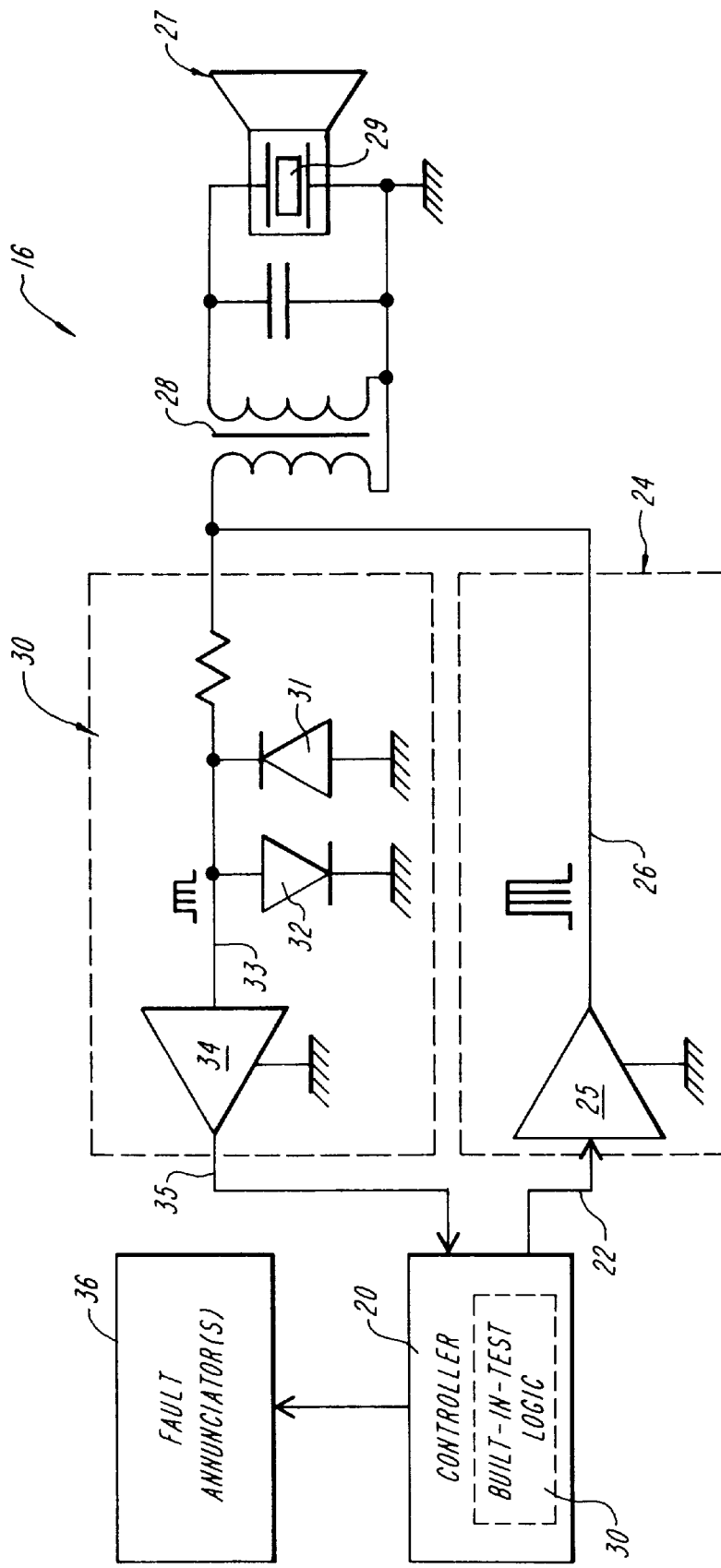
FIG. 2 is a functional block diagram illustration of the acoustic obstacle detection system of FIG. 1.

FIG. 2 is a functional block diagram illustration of the obstacle detection system 16. The system 16 includes an electronic controller 20 (e.g., a Motorola 68HC705P9 microcontroller) which executes programmable software routines to control the system and monitor it for failures. The controller 20 provides a transmit enable signal on a line 22 to a transmit circuit 24 which includes an amplifier 25 that generates and provides a periodic transmit signal (e.g., a squarewave, sinewave, etc.) on a line 26. The periodic transmit signal is applied to a piezoelectric transducer 27 through a transformer coupling 28. The transducer 27 is capable of transmitting and receiving ultrasonic energy, and includes a piezoelectric element 29.

The system 16 also includes a receive circuit 30 which is coupled to the transducer 27 through the transformer 28. The receive circuit 30 includes several diodes 31, 32 which limit (i.e., clamp) the value of the signal on line 33 to prevent direct application of the signal from the transmitter 24 to a vibration generated signal detector 34.

In the transmission mode, the piezoelectric element 29 transforms the periodic transmit signal on the line 26 to oscillatory motion in order to radiate ultrasonic waves.

In a receive mode, mechanical motion of the element 29 is transformed to a vibration generated signal which is input to the receive circuit 30. The vibration generated signal detector 34 detects the presence of the vibration generated signal and provides a receive status signal on a line 35 indicative of whether the signal is present.

The system 16 also includes a fault annunciator 36 which may include visual, audio, and other annunciators suitable for use in announcing a system fault to the user.

Figure 3:
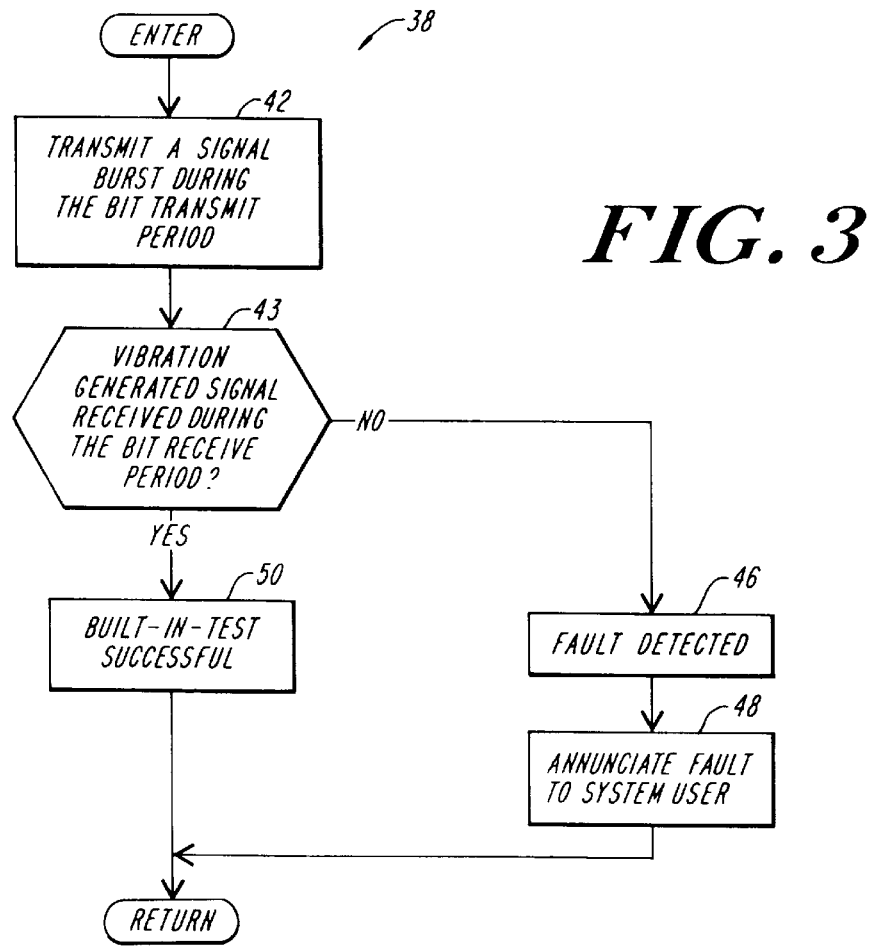
FIG. 3 is a flow chart illustration of the steps performed during BIT of the obstacle detection system.

According to the present invention, the controller 20 includes executable built-in-test (BIT) logic 38. FIG. 3 is a flow chart illustration of the BIT logic 38. The logic 21 may be executed during initialization of the system 16, and/or regularly during system operation. Referring now to FIGS. 2 and 3, upon entering the BIT logic 38, step 42 is executed by the controller 20 to issue the transmit enable signal on the line 22 in order to excite the piezoelectric element 29 during a BIT transmission period which has a duration of about 0.1–1 millisecond. The transmit enable signal induces a mechanical oscillation of the piezoelectric element. Following the BIT transmission period, step 43 is performed to check the state of the receive status signal on the line 35 to determine if the vibration generated signal is present. If it is not, step 46 is executed to record that a fault has occurred, followed by step 48 which annunciates the fault to a system user via the fault annunciators 36 (FIG. 2). The controller may also command the vehicle to stop, switch As to a back-up obstacle detection system or place the vehicle into a fail-safe operating mode. The details regarding the timing of the BIT transmit period and the BIT receive period shall now be discussed.

Figure 4:
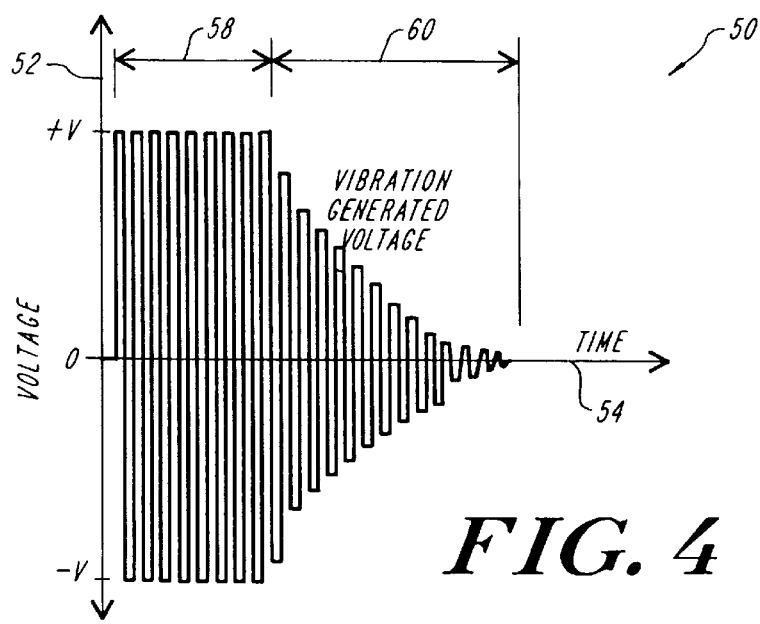
FIG. 4 is a plot of the voltage across a piezoelectric element of an acoustical transducer during the BIT as a function of time.

FIG. 4 is a plot 50 of voltage across the piezoelectric element 29 (FIG. 2) as a function of time. The voltage is plotted along a vertical axis 52 and time is plotted along a horizontal axis 54. During BIT transmission period 58, the transducer 27 (FIG. 2) is excited by the transmit enable signal on the line 26 which transitions between +V and −V. In a preferred embodiment, the frequency of the signal is approximately 40 kHz and the duration of the BIT transmission period 58 is about 0.1–1 millisecond. In general, the duration of the BIT transmission period 58 is selected to be rather brief (e.g., 0.1–1 millisecond) to ensure that the sum of the BIT transmission period and BIT receive period 60 is less than the time any reflected energy would be returned from objects in the field of view 18 (FIG. 1). The present invention checks for the presence of the vibration generated signal during the BIT receive period 60.

At the end of the BIT transmission period 58, the BIT receive period 60 begins and the controller reads the state of the receive status signal on the line 35 (FIG. 2) during the period 60 (preferably in about the middle of the period). If no failures exist in the system, the peak-to-peak voltage value of the vibration generated signal will have a non-zero value during the BIT receive period 60 as shown in FIG. 4. If the vibration generated signal was received, the detector 34 provides a logic "1" on the line 35. Otherwise the signal on the line 35 will be a logic "0" indicating that the vibration generated signal was not received during the BIT receive period 60.

Referring again to FIGS. 2 and 3, if the controller 20 determines in step 43 that the vibration generated signal is present, step 50 is performed to indicate that the system has passed the BIT.

Figure 5:
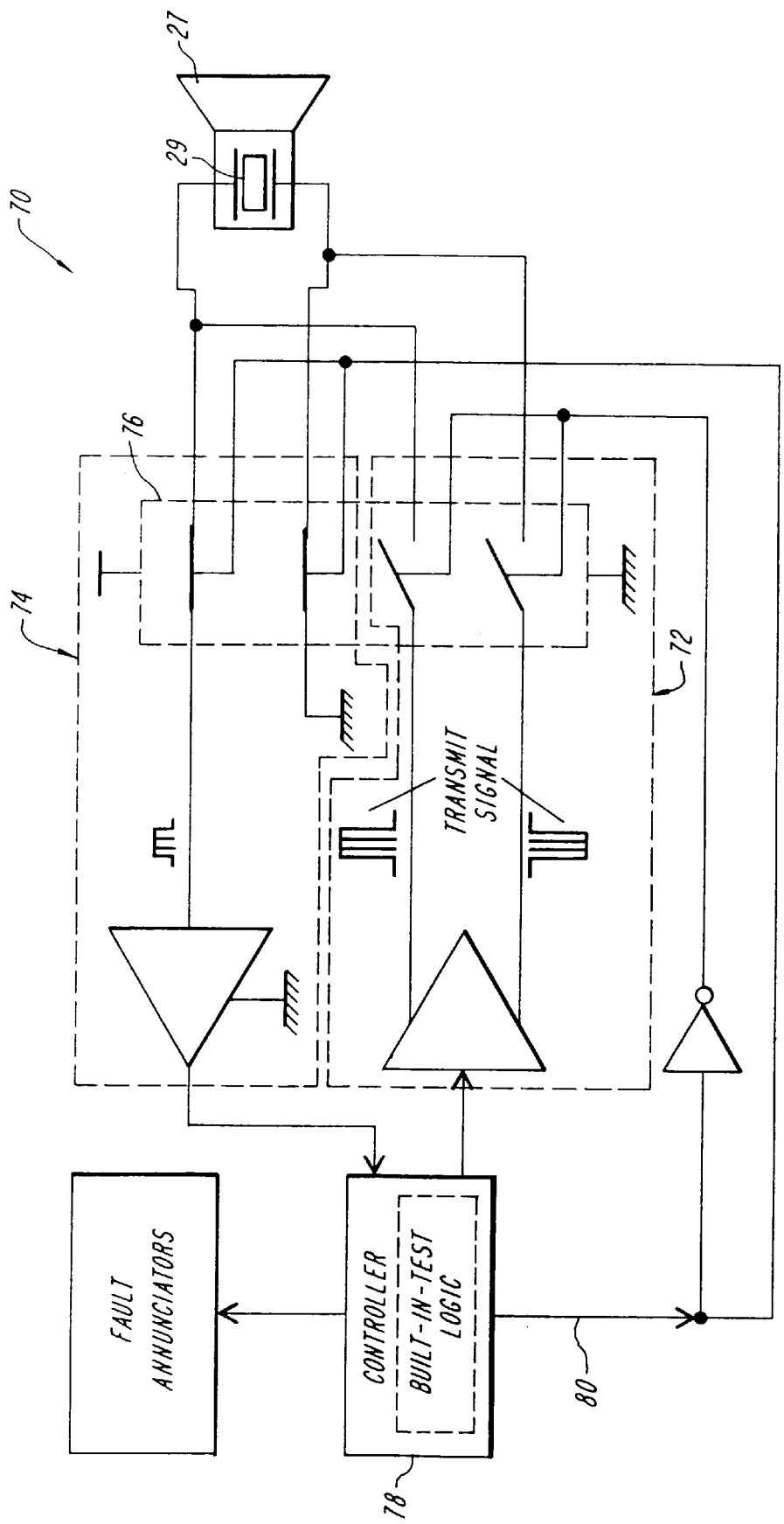
FIG. 5 is a functional block diagram of an alternative embodiment acoustic obstacle detection system.

FIG. 5 is a functional block diagram illustration of an alternative embodiment obstacle detection system 70. This embodiment is substantially the same as the embodiment illustrated in FIG. 2, with the principle exception that receive circuit 72 and the transmit circuit 74 are now coupled to the transducer 27 through a switching network 76, rather than the transformer. Advantageously, this allows the clamping diodes 31, 32 to be removed from the receiver. The state of the switches in the switching network 76 are controlled by a controller 78 which provides a switching control signal on a line 80 to ensure the receive circuit 74 and the transmit circuit 76 are not simultaneously coupled to the transducer 27. The BIT logic which is used in the alternative embodiment 70 is substantially the same as the logic 38 illustrated in FIG. 3, and in the interest of brevity shall not be repeated.

One of ordinary skill will recognize that various techniques may be used to verify that the transducer provides the vibration generated signal during the BIT receive period 60 (FIG. 4). For example, it is contemplated that the controller would monitor the vibration generated signal during the BIT receive period to verify that the signal is decaying. If it is not, a system fault exists and the controller notifies the system user.

Although the present invention has been shown and described with respect to several preferred embodiments thereof, various changes, emissions and additions to the form and detail thereof, may be made therein, without departing from the spirit and scope of the invention.

What is claimed is:

1. An obstacle detection system, comprising:
   an acoustic piezoelectric transducer;
   means for applying an AC transmit signal to said acoustic piezoelectric transducer during a built-in-test (BIT) transmission period; and
   means for sensing a vibration generated signal from said transducer during a BIT receive period during the absence of reflected ultrasonic energy associated with said acoustic piezoelectric transducer.

2. The system of claim 1 wherein said BIT transmission period is less than 1 millisecond in duration, and said BIT receive period occurs immediately following said BIT transmission period.

3. The system of claim 1 wherein said BIT transmission period is less than about 1 millisecond in duration, and said BIT receive period occurs for a short duration immediately following said transmission period.

4. The system of claim 1, wherein said transducer comprises:
   a switching network which interfaces said means for applying and said means for sensing to said transducer.

5. The system of claim 1, wherein said transducer comprises:
   a transformer network which couples said means for applying and said means for sensing to said transducer.

6. The system of claim 1, wherein said means for sensing includes means for generating a status signal indicative of whether said vibration generated signal is present, and the system further comprises a fault annunciator responsive to said status signal.

7. A vehicle mounted obstacle detection system, comprising:
   transmit circuitry which generates an AC transmit signal in response to a transmit control signal;
   an acoustic transducer, which includes a piezoelectric element that vibrates and radiates ultrasonic energy in response to said AC transmit signal, and provides a vibration generated signal indicative of piezoelectric element motion;
   receive circuitry which receives said vibration generated signal during a built-in-test (BIT) receive period during the absence of reflected ultrasonic energy associated with said acoustic piezoelectric transducer, and provides a receive status signal indicative of whether said vibration generated signal was received; and
   a controller which enables said transmit control signal during a short transmission period, and upon termination of the short transmission period checks the state of said receive status signal to determine if said vibration generated signal was received.

8. The system of claim 7, wherein said transmission period is less than 1 millisecond in duration, and said BIT receive period occurs immediately following said transmission period.

9. The system of claim 8, wherein said vibration generated signal is an AC signal.

10. The system of claim 9, wherein said acoustic transducer comprises:
    means for coupling said transmit circuitry and said receive circuitry to said transducer.

11. The system of claim 10, wherein said means for coupling comprises a transformer network.

12. The system of claim 10, wherein said means for coupling comprises:
    a switching network which interfaces said transmit circuitry and said receive circuitry to said transducer to ensure said transmit circuitry and said receive circuitry are not simultaneously connected to said transducer.

13. A method of testing an obstacle detection system which includes an acoustic transducer comprising a piezoelectric element, the method comprising the steps of:
    applying a transmit signal to the acoustic transducer which induces a vibration in the piezoelectric element;
    receiving a vibration generated signal from the transducer during a built-in-test (BIT) receive period; and
    generating a status signal indicative of whether said vibration generated signal is received during the BIT receive period during the absence of reflected ultrasonic energy associated with the acoustic transducer.

14. The method of claim 13, wherein said step of applying is less than about one millisecond in duration.

15. The method of claim 13, wherein said step of receiving comprises the step of:
    detecting said vibration generated signal and providing a received signal indicative thereof.

16. The method of claim 13, wherein the duration of said step of applying is less than about one millisecond.

17. The method of claim 13, wherein said transmit signal is an AC signal.

* * * * *